United States Patent
Kim et al.

(10) Patent No.: US 7,766,288 B2
(45) Date of Patent: Aug. 3, 2010

(54) DISPLAY APPARATUS

(75) Inventors: Dong-woo Kim, Seoul (KR); Kwang-sung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 11/651,571

(22) Filed: Jan. 10, 2007

(65) Prior Publication Data

US 2007/0210221 A1    Sep. 13, 2007

(30) Foreign Application Priority Data

Mar. 8, 2006    (KR)    ...................... 10-2006-0021931

(51) Int. Cl.
*F16M 11/00*    (2006.01)
(52) U.S. Cl. ................. 248/176.1; 248/276.1; 248/917; 248/919; 248/923
(58) Field of Classification Search ............. 248/176.1, 248/276.1, 917–923; 361/683
See application file for complete search history.

(56) References Cited

U.S. PATENT DOCUMENTS

| | | | | |
|---|---|---|---|---|
| 6,056,248 A | * | 5/2000 | Ma | ........................... 248/124.1 |
| 6,430,038 B1 | * | 8/2002 | Helot et al. | .................. 361/681 |
| 6,464,185 B1 | * | 10/2002 | Minelli et al. | ............. 248/183.1 |
| 6,595,481 B1 | | 7/2003 | Huang et al. | |
| 6,769,657 B1 | * | 8/2004 | Huang | ...................... 248/278.1 |
| 6,822,857 B2 | * | 11/2004 | Jung et al. | ................... 361/681 |
| 7,207,537 B2 | | 4/2007 | Hung | ...................... 248/284.1 |
| 7,384,019 B2 | * | 6/2008 | Choi | .......................... 248/136 |
| 2005/0002159 A1 | | 1/2005 | Jeong | |
| 2005/0247832 A1 | | 11/2005 | Cho et al. | |
| 2006/0000956 A1 | | 1/2006 | Cvek | |

FOREIGN PATENT DOCUMENTS

| | | |
|---|---|---|
| EP | 1 312 851 A2 | 5/2003 |
| KR | 20-0327070 Y1 | 9/2003 |
| KR | 10-0482007 B1 | 3/2005 |
| KR | 20-0392505 Y1 | 8/2005 |
| KR | 10-0662367 B1 | 12/2006 |
| WO | 2004065842 A1 | 8/2004 |

\* cited by examiner

*Primary Examiner*—Amy J Sterling
(74) *Attorney, Agent, or Firm*—Sughrue Mion, PLLC

(57) ABSTRACT

A display apparatus which folds a link member in the same plane to minimize the volume thereof is provided. The display apparatus includes a display main body, a base, a first link member relatively movably coupled to the display main body at a first end part thereof, and a second link member including a link accommodating part which accommodates the first link member, coupled with a second end part of the first link member through a link hinge unit at a first side thereof to move with respect to the first link member, and coupled with the base at a second side thereof.

18 Claims, 16 Drawing Sheets

DISPLAY APPARATUS

CROSS-REFERENCE TO RELATED APPLICATIONS

This application claims priority from Korean Patent Application No. 10-2006-0021931, filed on Mar. 8, 2006, in the Korean Intellectual Property Office, the disclosure of which is incorporated herein by reference.

BACKGROUND OF THE INVENTION

1. Field of the Invention

The present invention relates to a display apparatus, and more particularly, to a display apparatus which has an enhanced link configuration.

2. Description of the Related Art

Generally, a display apparatus comprises a display main body displaying an image thereon, a base supporting the display main body, and a link tilting, swiveling or elevating the display main body.

A related art display apparatus is disclosed in Korean Patent Application Publication No. 10-2004-0028113. The display apparatus comprises a lower link member rotatably coupled with a base hinge provided to a base member, an upper link member rotatably coupled with a display hinge provided to a display main body, and a link hinge allowing the upper link member to rotate at a predetermined angle with respect to the lower link member. The display apparatus further comprises a first sub link member coupling the lower link member with the base member in parallel to interlock rotating of the lower link member to the base member with rotating of the upper link member. The display apparatus further comprises a torsion coil spring elastically biasing the lower link member to upwardly rotate.

However, the related art display apparatus is limited in reducing a packed volume thereof, due to a large folded height of the lower link member and the upper link member. Also, the torsion coil spring has a maximum elastic force when the lower link member and the upper link member are folded for packing the display apparatus.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus which folds a link member in the same plane to minimize the volume thereof.

The present invention also provides a display apparatus which reduces an elastic force when a link member is folded for packing.

According to an aspect of the present invention, there is provided a display apparatus comprising a display main body; a base; a first link member relatively movably coupled to the display main body at a first end part thereof; and a second link member comprising a link accommodating part which accommodates the first link member, coupled with a second end part of the first link member through a link hinge unit at a first side thereof to relatively move with respect to the first link member, and coupled with the base at a second side thereof.

According to another aspect of the present invention, the link accommodating part accommodates the first link member in the same plane as the second link member.

According to another aspect of the present invention, the display main body and the first end part of the first link member are coupled through a main body hinge unit which parallels the link hinge unit.

According to another aspect of the present invention, the base and the second side of the second link member are coupled through a base hinge unit which parallels the link hinge unit.

According to another aspect of the present invention, the display apparatus further comprises a swiveling hinge unit coupled to the base to swivel the display main body with respect to an installation surface.

According to another aspect of the present invention, the display apparatus further comprises a sub link member interposed between the display main body and the base to transfer a rotation of the first link member with respect to the second link member to the display main body.

According to another aspect of the present invention, the display apparatus further comprises a sub elastic member interposed between the first link member and the sub link member to elastically bias the display main body.

According to another aspect of the present invention, the first link member and the second link member comprise a cable accommodating part which accommodates a cable.

According to another aspect of the present invention, the display main body moves with respect to the first link member when at least one of the first link member and the second link member moves with respect to the base.

According to another aspect of the present invention, the display apparatus further comprises at least one elastic cam unit provided to the first link member to controllably bias the display main body within a predetermined range when the first link member moves with respect to the base.

According to another aspect of the present invention, the elastic cam unit comprises an elastic cam member which elastically biases the display main body; a cam comprising a first elastic cam member supporting part which supports the elastic cam member, and an accommodating slot; and a cam link which connects the cam and the link hinge unit.

According to another aspect of the present invention, the first link member comprises an elastic cam member accommodating part which accommodates the elastic cam member, and a side of the elastic cam member accommodating part comprises a second elastic member supporting part which supports the elastic cam member.

According to another aspect of the present invention, the link hinge unit comprises a cam link accommodating part which accommodates the cam link.

According to another aspect of the present invention, there is provided a display supporting apparatus comprising a base; a first link member which rotates with respect to the base; and a second link member comprising a link accommodating part which accommodates the first link member, coupled with a second end part of the first link member through a link hinge unit at a first side thereof to move with respect to the first link member, and coupled with the base at a second side thereof.

According to another aspect of the present invention, the link accommodating part accommodates the first link member in the same plane as the second link member.

According to another aspect of the present invention, a display main body and the first end part of the first link member are coupled through a main body hinge unit which parallels the link hinge unit.

According to another aspect of the present invention, the base and the second side of the second link member are coupled through a base hinge unit which parallels the link hinge unit.

According to another aspect of the present invention, the display supporting apparatus further comprises a swiveling hinge unit coupled to the base to swivel the display main body with respect to an installation surface.

According to another aspect of the present invention, the display supporting apparatus further comprises a sub link member interposed between the display main body and the base to transfer a rotation of the first link member with respect to the second link member to the display main body.

According to another aspect of the present invention, the display supporting apparatus further comprises a sub elastic member interposed between the first link member and the sub link member to elastically bias against the display main body.

According to another aspect of the present invention, the first link member and the second link member respectively comprise a cable accommodating part which accommodates a cable.

According to another aspect of the present invention, a display main body moves with respect to the first link member when at least one of the first link member and the second link member moves with respect to the base.

According to another aspect of the present invention, the display supporting apparatus further comprises at least one elastic cam unit provided to the first link member to controllably bias a display main body within a predetermined range when the first link member moves with respect to the base.

According to another aspect of the present invention, the elastic cam unit comprises an elastic cam member which elastically biases the display main body; a cam comprising a first elastic cam member supporting part which supports the elastic cam member, and an accommodating slot; and a cam link which connects the cam and the link hinge unit.

According to another aspect of the present invention, the first link member comprises an elastic cam member accommodating part which accommodates the elastic cam member, and a side of the elastic cam member accommodating part comprises a second elastic member supporting part which supports the elastic cam member.

According to another aspect of the present invention, the link hinge unit comprises a cam link accommodating part which accommodates the cam link.

BRIEF DESCRIPTION OF THE DRAWINGS

The above and other aspects of the prevent invention will become apparent and more readily appreciated from the following description of exemplary embodiments, taken in conjunction with the accompanying drawings, in which.

DETAILED DESCRIPTION OF EXEMPLARY EMBODIMENTS OF THE INVENTION

Figure 1:
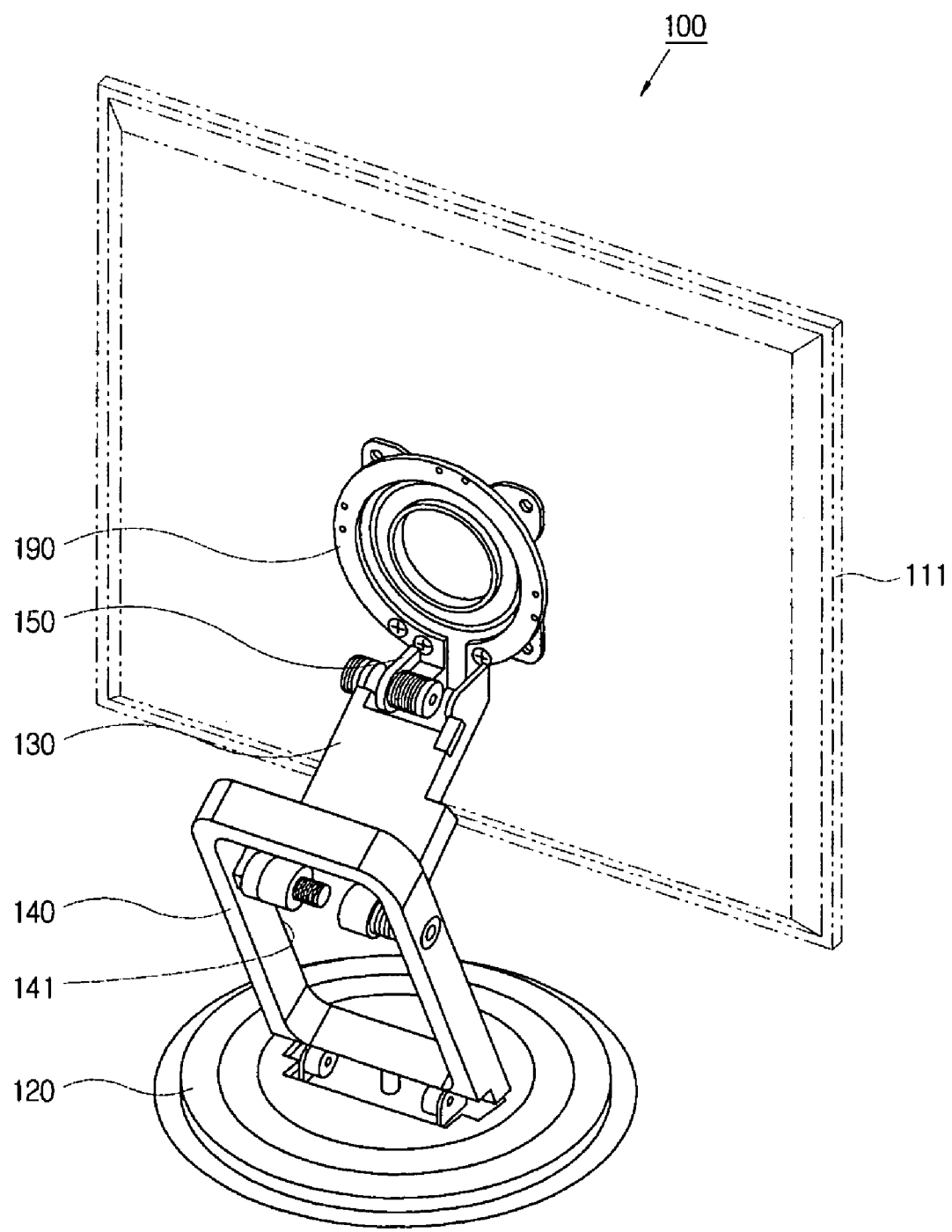
FIG. 1 is a rear perspective view illustrating a display apparatus according to an exemplary embodiment of the present invention.
Figure 2:
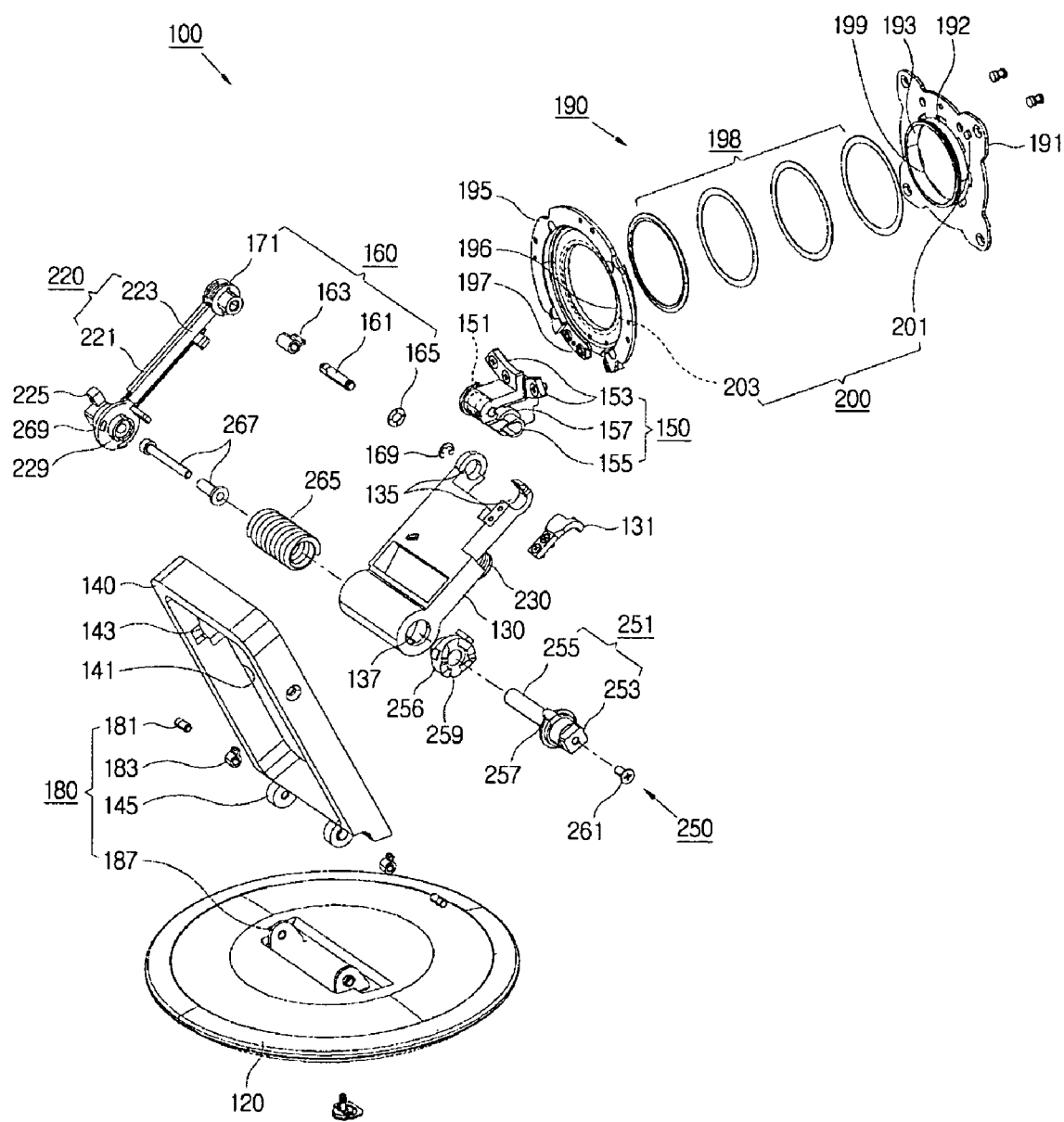
FIG. 2 is a partial exploded perspective view illustrating the display apparatus in FIG. 1.
Figure 3:
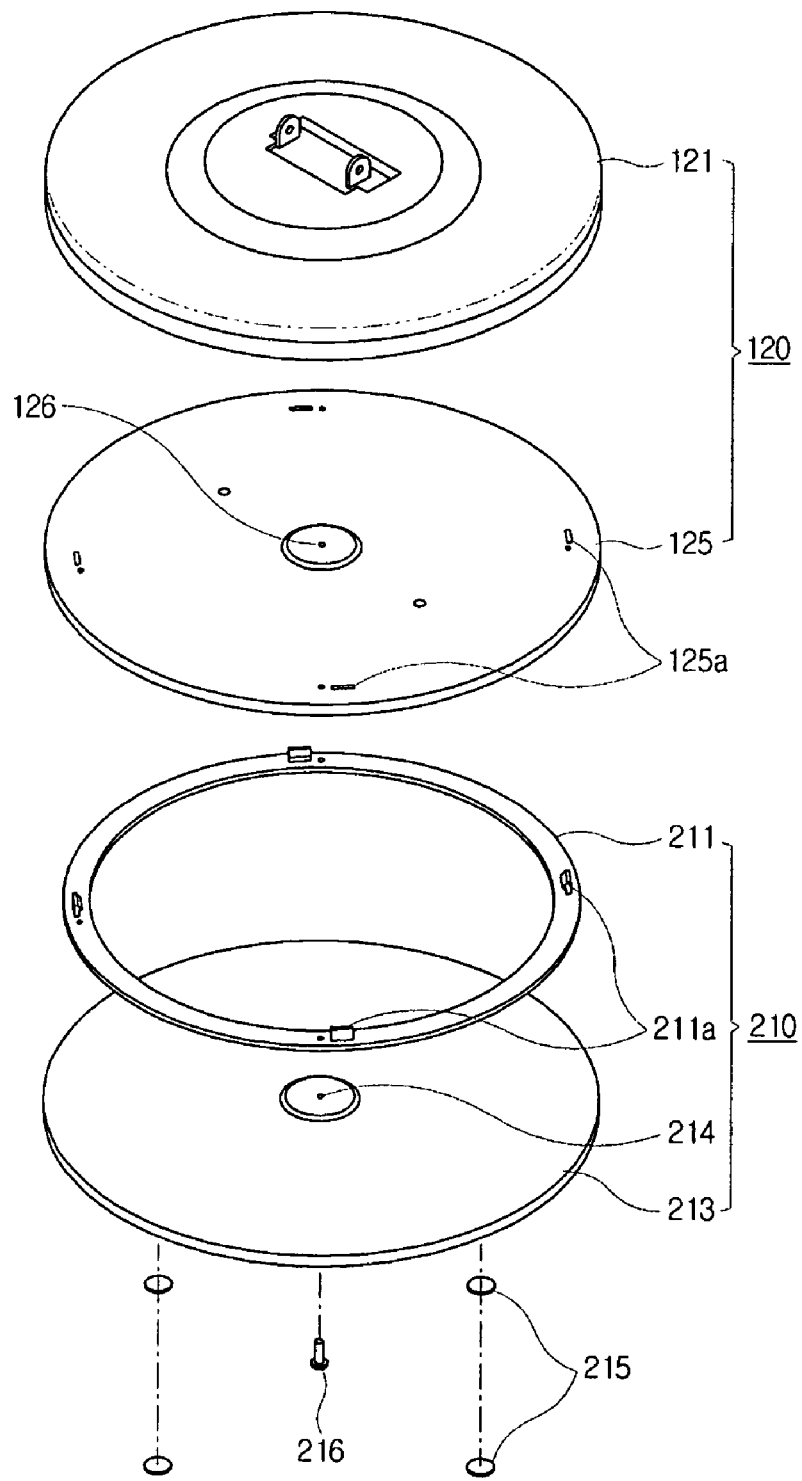
FIG. 3 is an exploded perspective view illustrating a base in FIG. 1.
Figure 4:
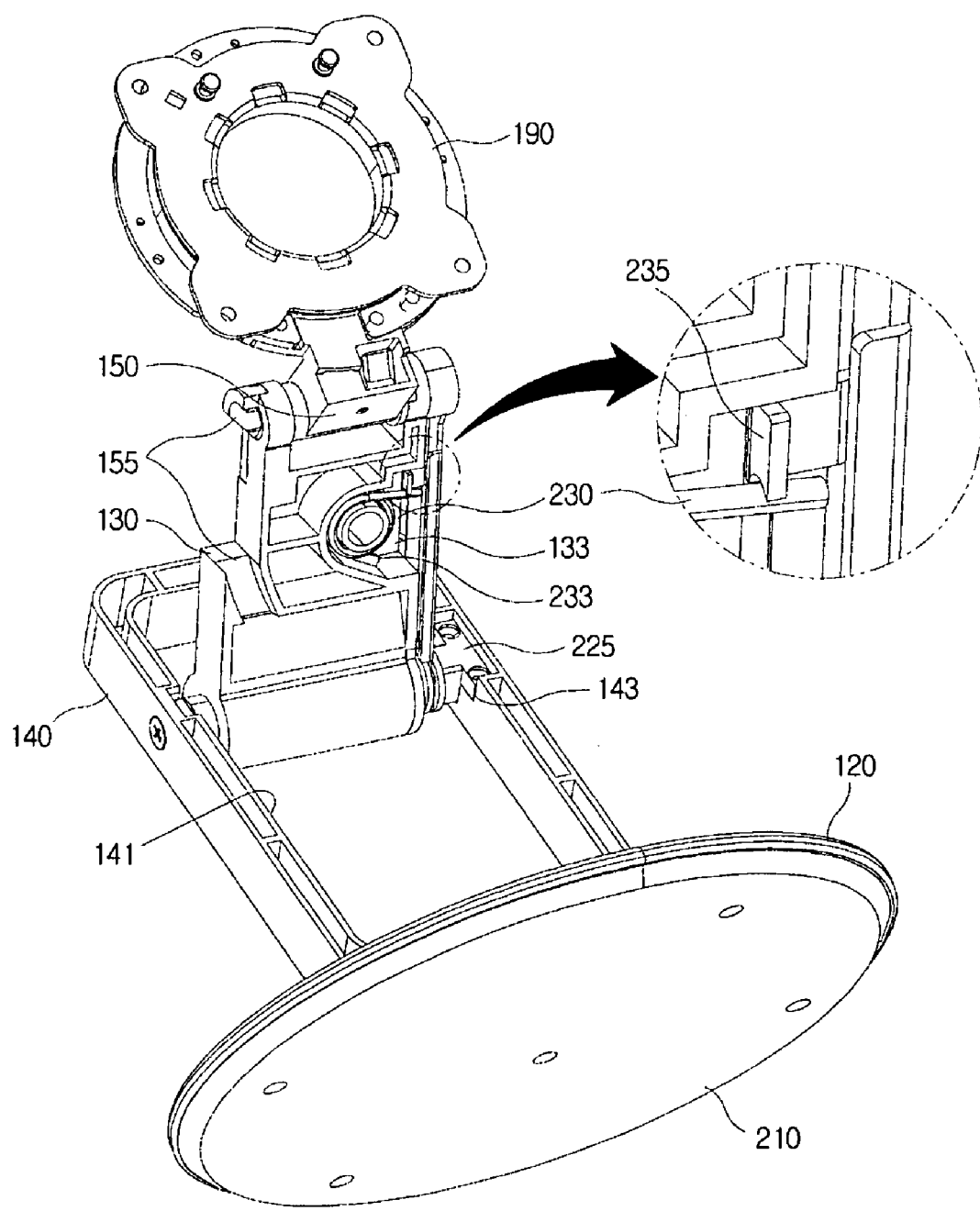
FIG. 4 is an enlarged rear perspective view illustrating the display apparatus in FIG. 1.

Reference will now be made in detail to exemplary embodiments of the present invention, examples of which are illustrated in the accompanying drawings, wherein like reference numerals refer to like elements throughout. The exemplary embodiments are described below to explain the present invention by referring to the figures.

Figure 8:
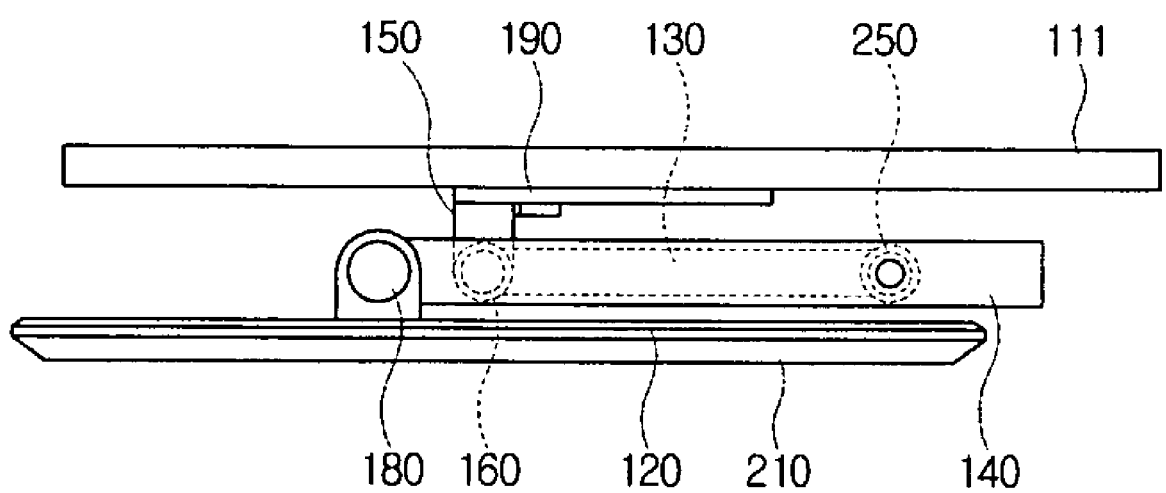
FIG. 8 is a side view illustrating a state in which the display main body, the first link member, the second link member, and the base are folded in parallel according to an exemplary embodiment of the present invention.

As shown in FIGS. 1 to 4, a display apparatus 100 according to an exemplary embodiment of the present invention comprises a display main body 111; a base 120 supporting the display main body 111; a first link member 130 provided with a first end part relatively movably coupled to the display main body 111; and a second link member 140 provided with a link accommodating part 141 accommodating the first link member 130. A first side (upper end) of the second link member 140 is coupled to a second end part of the first link member 130 through a link hinge unit 250, so that the first link member 130 and the second link member 140 relatively move between a folded position in which the first link member 130 is accommodated within the link accommodating part 141, and an erected position in which the first link member 130 is withdrawn therefrom. A second side (lower end) of the second link member 140 is coupled to the base 120. Thus, in the folded position the second end part of the first link member 130 is near the lower end of the second link member 140 (FIG. 8). The display apparatus 100 further comprises a main body hinge unit 160 and a base hinge unit 180 having axes which are parallel to the axis of the link hinge unit 250. The display apparatus 100 further comprises a swiveling hinge unit 210 coupled to the base 120 so that the display main body 111 swivels with respect to an installation surface. The display apparatus 100 further includes a sub link member 220 and a sub elastic member 230 interposed between the first link member 130 and the sub link member 220 to bias against the weight of the display main body 111.

The display main body 111 may be a flat display panel, such as a liquid crystal display (LCD) or a plasma display panel (PDP). Alternatively, the display main body 111 may be a cathode ray tube (CRT) or another type of display. The display main body 111 may be mounted to an arm stand (not shown) satisfying the Video Electronics Standards Association (VESA) standard.

The base 120 has a planar shape to be supported on an installation surface, such as a desk or table. The base 120 is coupled with the second link member 140. The base 120 comprises a base frame 123 coupled with the second link member 140, and a base cover 121 provided to an upper side of the base frame 123. The installation surface on which the base 120 is disposed preferably has a level surface. Alternatively, the installation surface may have a inclined surface, such as a wall.

The base cover 121 is preferably formed by a plastic injection molding method. Alternatively, the base cover 121 may be formed of various materials, such as aluminum, to enhance an external appearance thereof. The base cover 121 may be coupled with the base frame 123 through a screw.

The base frame 123 is preferably formed in a planar shape, and of a metal that has a sufficient strength. Alternatively, the base frame 123 may be formed of a plastic material or other materials, as long as it has a sufficient strength.

The first link member 130 has a quadrangular planar shape. A lower side of the first link member 130 is tiltably coupled to the second link member 140 through the link hinge unit 250, and an upper side thereof is tiltably coupled to a main body bracket 150 through the main body hinge unit 160. The first link member 130 includes an upper shaft supporting part 135 provided to upper opposite sides thereof, and accommodating an upper shaft 171 of the main body hinge unit 160 and a tilting shaft 157 to be rotatably coupled with the main body bracket 150. The first link member 130 comprises a lower shaft supporting part 137 provided to a lower central part thereof and provided with a first side accommodating the tilting shaft 157, and a second side accommodating an end part of a second link coupling member 256 of the link hinge unit 250 to be rotatably coupled with the second link member 140. The first link member 130 comprises a sub elastic member accommodating part 133 depressed in a rear side thereof to accommodate the sub elastic member 230.

A part of the upper shaft supporting part 135 may be removed to easily accommodate a main body hinge shaft 161 and a main body contact spring member 163.

The second link member 140 has a quadrangular shape, and includes the link accommodating part 141 formed in a central part thereof to accommodate the first link member 130. A lower side of the second link member 140 is tiltably coupled to the base 120 by the base hinge unit 180, and an upper side thereof is tiltably coupled to the first link member 130 by the link hinge unit 250. The second link member 140 comprises a base hinge shaft supporting part 145 provided to lower opposite sides of the second link member 140 to accommodate a base hinge shaft 181, and a link member bracket accommodating part 143 provided to upper opposite sides thereof to accommodate a first link hinge shaft 251 of the link hinge unit 250 and a sub link member bracket 225 of the sub link member 220. The second link member 140 may comprise a cable accommodating part (not shown). The second link member 140 may comprise a coupling screw hole 147 formed to a side of the link member bracket accommodating part 143. Alternatively, the link accommodating part 141 may be provided to the first link member 130 to accommodate the second link member 140.

Accordingly, the second link member 140 can accommodate the first link member 130 in the same plane to minimize the volume thereof.

The main body bracket 150 comprises a pivoting coupling part 153 provided to a front side thereof to be coupled with a pivoting bracket 195 of a pivoting hinge unit 190 through a coupling means, such as a screw. A main body hinge shaft supporting part 151 is formed in a first rear end of the main body bracket 150 to accommodate the main body hinge shaft and the main body contact spring member 163. The titling shaft 157 is formed to a second rear end of the main body bracket 150, and is accommodated to the upper shaft supporting part 135 of the first link member 130 to be tiltably coupled with respect to the first link member 130. The tilting shaft 157 may be hollow to accommodate a cable therein. Thus, the main body bracket 150 can couple the pivoting hinge unit 190 with the main body hinge unit 160.

The main body hinge unit 160 is provided between an upper end part of the first link member 130 and the main body bracket 150. The main body hinge unit 160 comprises the upper shaft 171, a part of which is cut out to be coupled with at least one sub link member 220. The main body hinge unit 160 comprises the main body hinge shaft 161. A first end of the main body hinge shaft 161 is forcedly inserted into the upper shaft 171 to have a rotating friction force, and a second end thereof is accommodated to the main body hinge shaft supporting part 151 of the main body bracket 150. The main body hinge unit 160 comprises the main body contact spring member 163 inserted into the main body hinge shaft supporting part 151 to be forcedly contacted to a circumference of the main body hinge shaft 161. The main body hinge unit 160 further comprises a contact washer 165 supplying a friction force when the first link member 130 and the main bracket 150 rotate, and a stopping ring 167 coupled to an end part of the main body hinge shaft 161 to prevent the main body hinge shaft 161 from moving along the axis thereof.

Accordingly, when a user pushes the display main body 111, the main body bracket 150 coupled with the display main body 111 can tilt about the main body hinge shaft 161 with respect to the first link member 130. The main body hinge shaft 161 preferably has a suitable rotating friction force to overcome a predetermined force. Also, at least one of the first link member 130 and the second link member 140 can tilt with respect to the base 120, and accordingly, the display main body 111 can move with respect to the first link member 130.

The base hinge unit 180 is provided between a lower end part of the second link member 140 and the base 120. The base hinge unit 180 further comprises the base hinge shaft 181 serving as a rotating axis, and a base contact spring member 183 inserted into the base hinge shaft supporting part 145 of the second link member 140, to be forcedly contacted to a circumference of the base hinge shaft 181. The base hinge unit 180 further comprises a base hinge shaft coupling part 187 bent from a plate surface of the base 120 and coupled with the base hinge shaft 181. The base hinge unit 180 may be further provided with a rotation angle restricting part (not shown) restricting the second link member 140 to rotate with respect to the base 120 within a predetermined range.

Accordingly, when a user pushes the display main body 111, the second link member 140 coupled with the base 120 can tilt about the base hinge shaft 181 with respect to the base 120. The base hinge shaft 181 preferably has a suitable rotating friction force to overcome a predetermined force.

The pivoting hinge unit 190 is provided between the display main body 111 and the main body hinge unit 160 to pivotably support the display main body 111 with respect to the main body bracket 150. The pivoting hinge unit 190 comprises the pivoting bracket 195 coupled to the main body hinge unit 160, a display bracket 191 provided with a first side pivotably coupled to the pivoting bracket 195 and a second side coupled to the display main body 111, and a pivoting shaft 192 protruding from one of the pivoting bracket 195 and the display bracket 191 toward the other thereof, so that the display bracket 191 pivots with respect to the pivoting bracket 195. The pivoting hinge unit 190 further comprises a pivoting angle restricting part 200 restricting a rotating angle of the display bracket 191 with respect to the pivoting bracket 195.

A first side of the display bracket 191 is coupled to a rear side of the display main body 111 through a coupling means, such as a screw, and the pivoting shaft 192 protrudes backward from a second side thereof.

The pivoting bracket 195 comprises a pivoting shaft accommodating part 196 rotatably coupled with the pivoting shaft 192, and a main body bracket coupling part 197 coupled with the pivoting coupling part 153 of the main body bracket 150 through a coupling means, such as a screw.

The pivoting shaft 192 comprises a pivoting shaft through part 199 having a cylindrical shape, through which a cable connected with the display main body 111 passes. A bent part 193 is provided to an end part of the pivoting shaft 192 to press a rear circumference of the pivoting shaft accommodating part 196 after the pivoting shaft 192 is inserted into the pivoting shaft accommodating part 196. Thus, the display bracket 191 is pressed toward the pivoting bracket 195 by the bent part 193 to generate a rotating friction force therebetween. A washer 198 may be provided between the display bracket 191 and the pivoting bracket 195.

The pivoting angle restriction part 200 comprises a protrusion 201 protruding from one of the display bracket 191 and the pivoting bracket 195 toward the other thereof, and a protrusion guiding part 203 provided to the other thereof to guide the protrusion 201 to rotate approximately 180 to 360 degree.

The swiveling hinge unit 210 is provided to a lower part of the base 120 to swivel the display main body 111 with respect to the base 120. The swiveling hinge unit 210 comprises a swiveling member 211 coupled to a lower side of the base 120, and a swiveling supporting part 213 provided with a first side supported against an installation surface, and a second side slidably supporting the swiveling member 211.

The swiveling member 211 has a ring shape to be coupled with the base frame 123 of the base 120. An upper side of the swiveling member 211 is provided with an engaging part 21 la protruding to be engaged with an engaging groove 125a of the base frame 123, and a lower side thereof has a semicircular section to line-contact with the swiveling supporting part 213. Thus, the swiveling member 211 can be slidably linecontacted with the swiveling supporting part 213, so that the display main body 111 smoothly swivels.

The swiveling supporting part 213 has a circular planar shape to be seated on an installation surface, such as a table. A frame coupling part 214 is provided to a central part of the swiveling supporting part 213 to be rotatably coupled to the base frame 123. The swiveling supporting part 213 is coupled to the frame coupling part 214 and a supporting coupling part 126 of the base frame 123 through a coupling screw 216. The coupling screw 216 has a suitable coupling length to allow the swiveling supporting part 213 to rotate with respect to the base frame 123. A contact pad 215 may be provided to a lower surface of the swiveling supporting part 213 to prevent noise and sliding against an installation surface. Thus, the display main body 111 coupled with the base 120 can smoothly swivel with respect to the swiveling supporting part 213.

The sub link member 220 comprises a first sub link member 221 and a second sub link member 223, each of which is provided in a rod shape. Upper end parts of the first and second sub link members 221 and 223 are coupled to the upper shaft 171. The sub link member 220 comprises a lower sub link coupling part 269 provided with a lower shaft 229. The lower shaft 229 is coupled to lower end parts of the first and second sub link members 221 and 223, and is supported by the lower shaft supporting part 137. One of the first and second sub link members 221 and 223 comprises a second sub elastic member engaging part 235 engaged with a first end part of the sub elastic member 230. Alternatively, the sub link member 220 may be provided to connect the link hinge unit 250 and the base hinge unit 180.

Accordingly, the sub link member 220 can interlock the main body bracket 150 with the link hinge unit 250, so that rotating of the first link member 130 with respect to the second link member 140 is transferred to the display main body 111.

A first end part of the sub elastic member 230 is coupled to the first link member 130, and a second end part thereof is coupled to the sub link member 220, so that the sub elastic member 230 elastically pushes against the weight of the display main body 111. The sub elastic member 230 is provided as a coil spring. The first end part thereof is engaged with a first sub elastic member engaging part 233 protruding from a surface of the first link member 130, and the second end part thereof is engaged with the second sub elastic member engaging part 235 of the sub link member 220. Thus, the sub elastic member 230 can be prevented from being separated therefrom.

Accordingly, the sub elastic member 230 can smoothly move and easily overcome the weight of the display main body 111 when the display main body 111 tilts.

The link hinge unit 250 couples the first link member 130 and the second link member 140 to move between the folded position and the erected position. The first link hinge shaft 251 is provided to a first end part of the link hinge unit 250 to be coupled to the lower shaft supporting part 137 of the first link member 130, and the lower sub link coupling part 269 is provided to a second end part of the link hinge unit 250 to be coupled to the sub link member 220, and is provided with a second link hinge shaft 267 to be coupled to the lower shaft supporting part 137. The link hinge unit 250 includes link rotating angle restricting parts 257 and 259 provided with a link protrusion 257, and a link protrusion guiding part 259. The link protrusion 257 protrudes from one of a second link coupling part 253 and the first link hinge shaft 251 toward the other thereof. The link protrusion guiding part 259 is provided to one of the second link coupling part 253 and the first link hinge shaft 251 to rotatably guide the link protrusion 257 within a predetermined range. The link hinge unit 250 comprises a link hinge shaft coupling screw 261 coupling the first link hinge shaft 251 to the second link member 140, and an elastic member 265 accommodated to the lower shaft supporting part 137 to elastically push the weight of the display main body 111 when the first link member 130 and the second link member 140 rotate.

Hereinafter, an operation of the display apparatus 100 according to an exemplary embodiment of the present invention will be described by referring to FIGS. 5 to 10.

Figure 5:
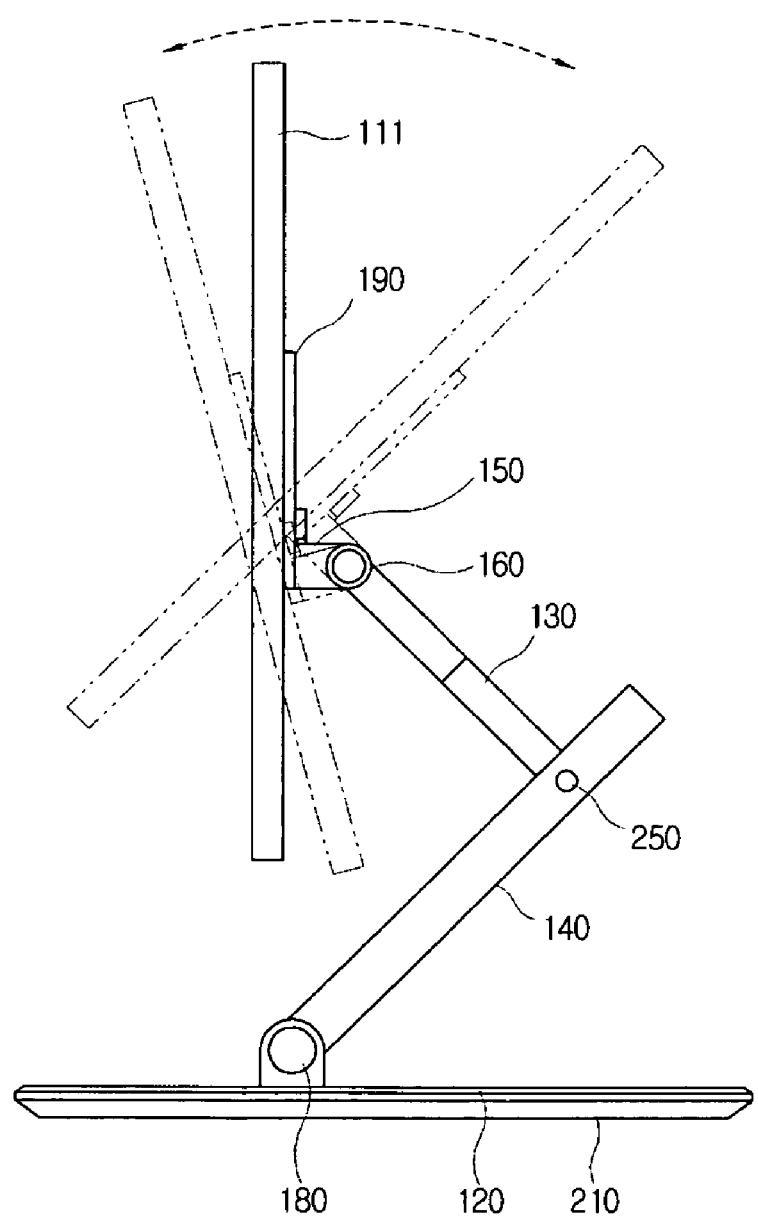
FIG. 5 is a side view illustrating a tilting operation of a display main body with respect to a connecting bracket according to an exemplary embodiment of the present invention.

As shown in FIG. 5, the main body bracket 150 of the display main body 111 tilts about the main body hinge shaft 161 of the main body hinge unit 160. The main body hinge shaft 161 is forcedly inserted into the main body hinge shaft supporting part 151 of the main body bracket 150 and the main body contact spring member 163. Accordingly, a user should apply a predetermined force to tilt the display main body 111.

Figure 6:
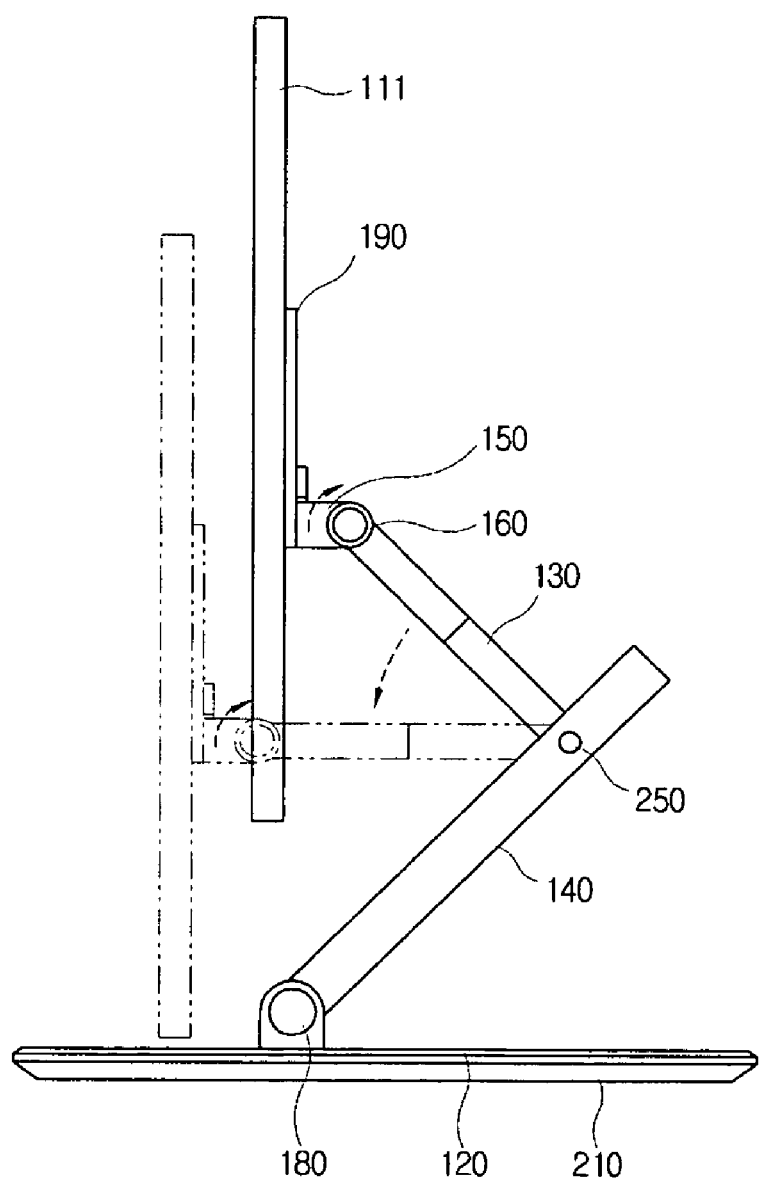
FIG. 6 is a side view illustrating a tilting operation of a first link member with respect to a second link member according to an exemplary embodiment of the present invention.

As shown in FIG. 6, the first link member 130 tilts about the first and second link hinge shafts 251 and 267 of the link hinge unit 250. When the first link member 130 tilts about the first and second link hinge shafts 251 and 267, the sub link member 220 rotates together with the first link member 130, and the upper shaft 171 of the main body hinge unit 160 rotates by means of the rotation of the sub link member 220. The main body hinge shaft 161 coupled with the upper shaft 171 rotates, and the main body bracket 150 rotates by means of the main body hinge shaft 161 being forcedly inserted into the main body bracket 150. Thus, the rotation of the first link member 130 can be interlocked with the rotation of the display main body 111. Accordingly, the display main body 111 can uniformly maintain a viewing angle, and the height thereof can be adjusted. The sub elastic member 230 allows the weight of the display main body 111 to be easily overcome. Accordingly, the rotation thereof can be smoothly accomplished.

Figure 7:
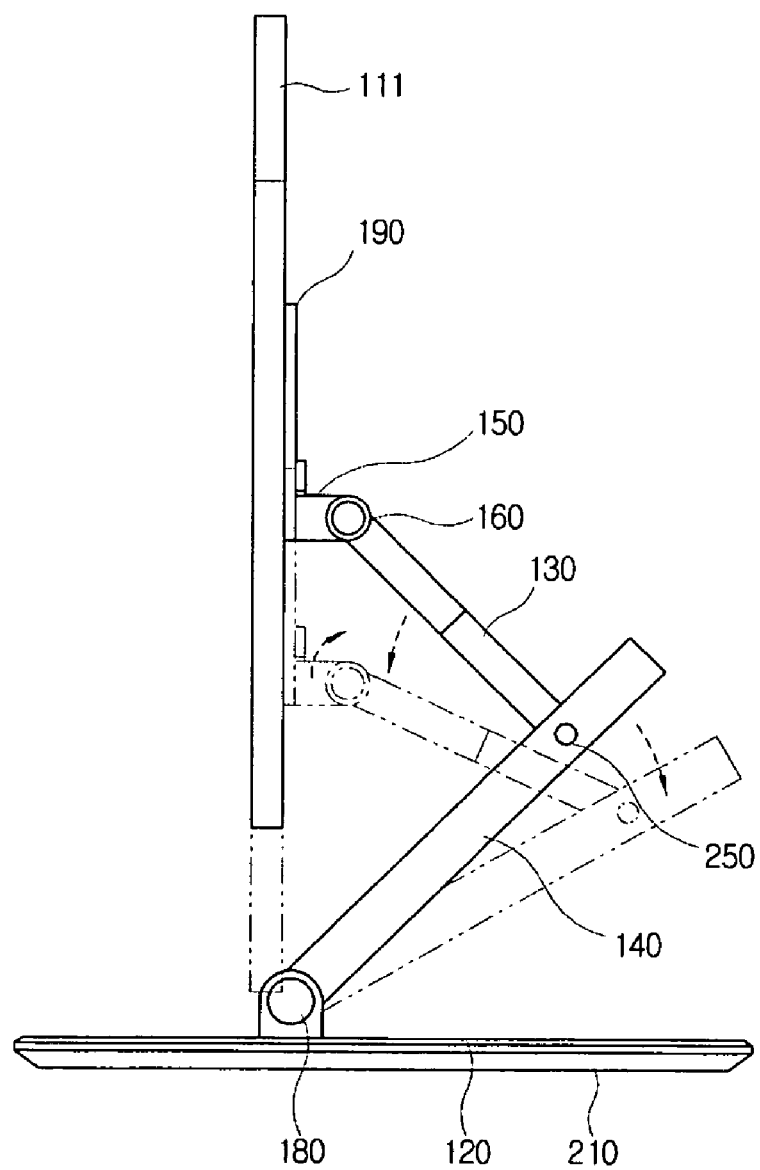
FIG. 7 is a side view illustrating a tilting operation of the first link member and the second link member with respect to a base according to an exemplary embodiment of the present invention.

As shown in FIG. 7, the second link member 140 tilts about the base hinge shaft 181 of the base hinge unit 180. Alternatively, an auxiliary sub link member, such as the sub link member 220, may be provided therebetween. Thus, when the second link member 140 tilts about the base hinge unit 180, the display main body 111 can tilt with respect to the first link member 130 to uniformly maintain a viewing angle thereof, and the height of the display main body 111 can be adjusted with an extended range.

As shown in FIG. 8, the display apparatus 100 according to an exemplary embodiment of the present invention can relatively rotate the first link member 130 and the second link member 140, because the base hinge shaft 181 and the first and second link hinge shafts 251 and 267 have different rotating axes. The first link member 130 can be accommodated to the link accommodating part 141 of the second link member 140, so that the first link member 130 and the second link member 140 are positioned in the same plane. Also, the first link member 130 and the main body bracket 150 can be rotated about the main body hinge shaft 161, so that the display main body 111 is folded to parallel the base 120. Thus, the display apparatus 100 can fold the base 120, the first link member 130 and the second link member 140 in parallel, and position the first link member 130, and the second link member 140 in the same plane, to thereby minimize a packed volume thereof and reduce costs.

Figure 9:
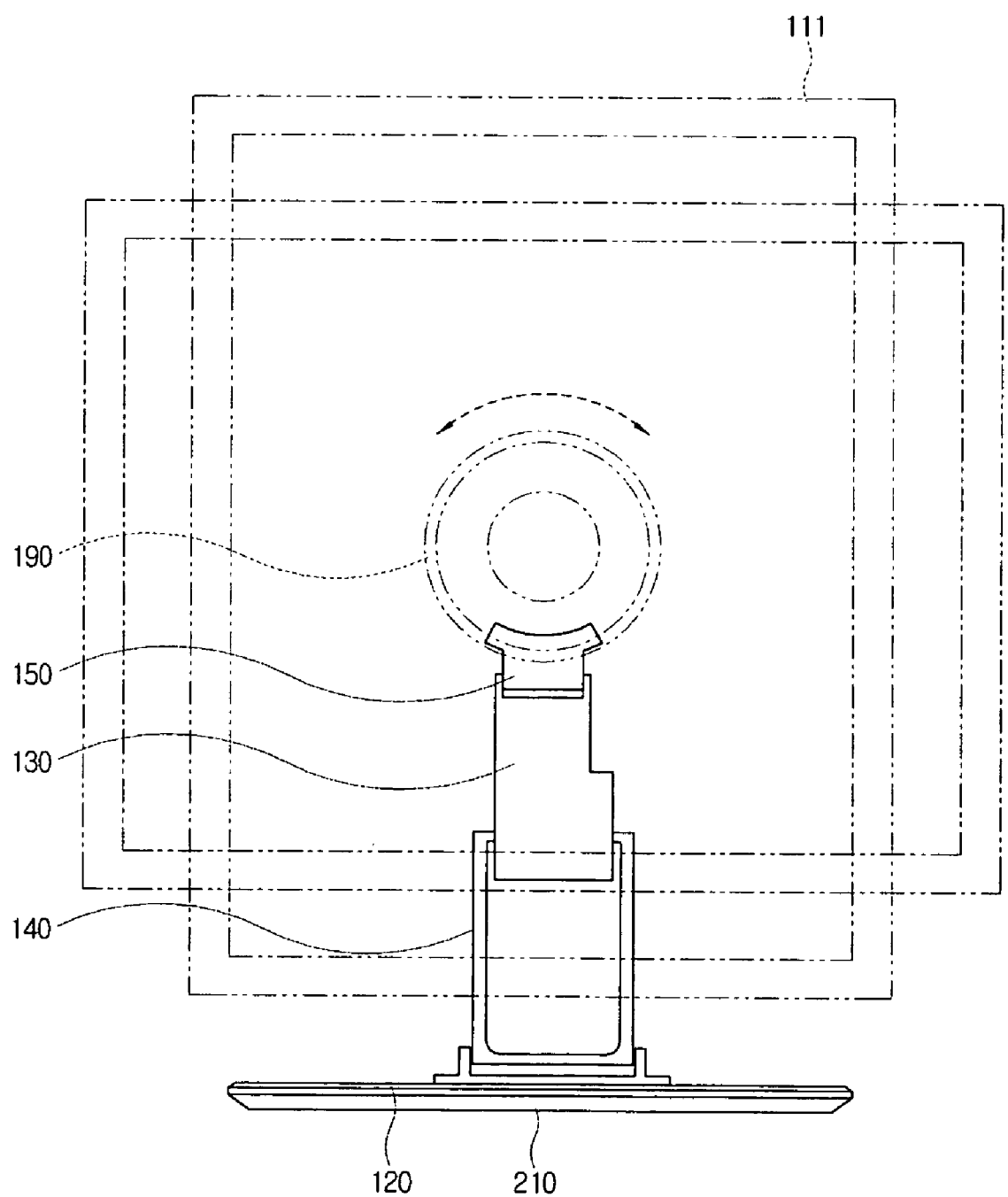
FIG. 9 is a front view illustrating a pivoting operation of the display main body according to an exemplary embodiment of the present invention.

As shown in FIG. 9, when the display main body 111 pivots about the pivoting shaft 192, the protrusion 201 moves along the protrusion guiding part 203. If the angle between the opposite sides of the protrusion guiding part 203 is approximately 180 degrees, the display main body 111 can pivot approximately 180 degrees with respect to the main body bracket 150. Thus, the display apparatus 100 can pivot the display main body 111 through the pivoting hinge unit 190 without difficulty.

Figure 10:
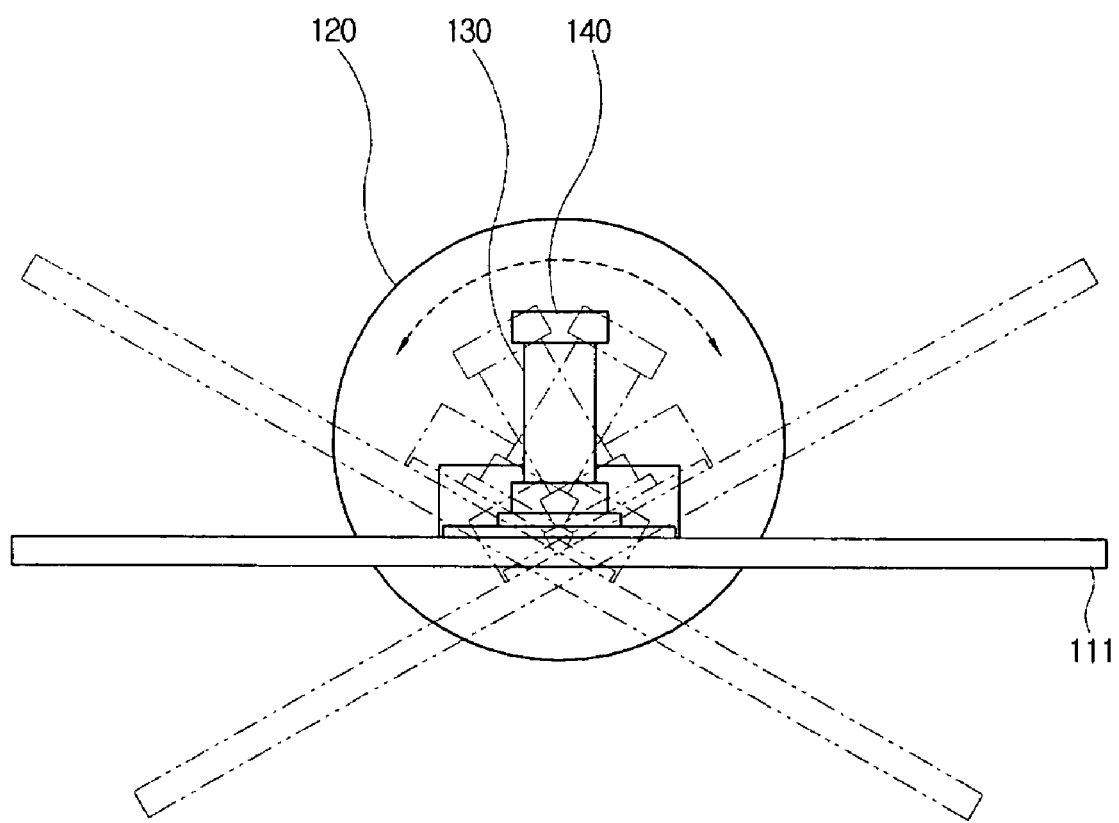
FIG. 10 is a plan view illustrating a swiveling operation of the display main body according to an exemplary embodiment of the present invention.

As shown in FIG. 10, the display main body 111 can swivel about a central axis of the coupling screw 216 with respect to the base 120 with a predetermined angle. It is preferable that the display main body 111 swivels from 180 degrees to 360 degrees. Thus, the display apparatus 100 can swivel the display main body 111 through the swiveling hinge unit 210 without difficulty.

Figure 11:
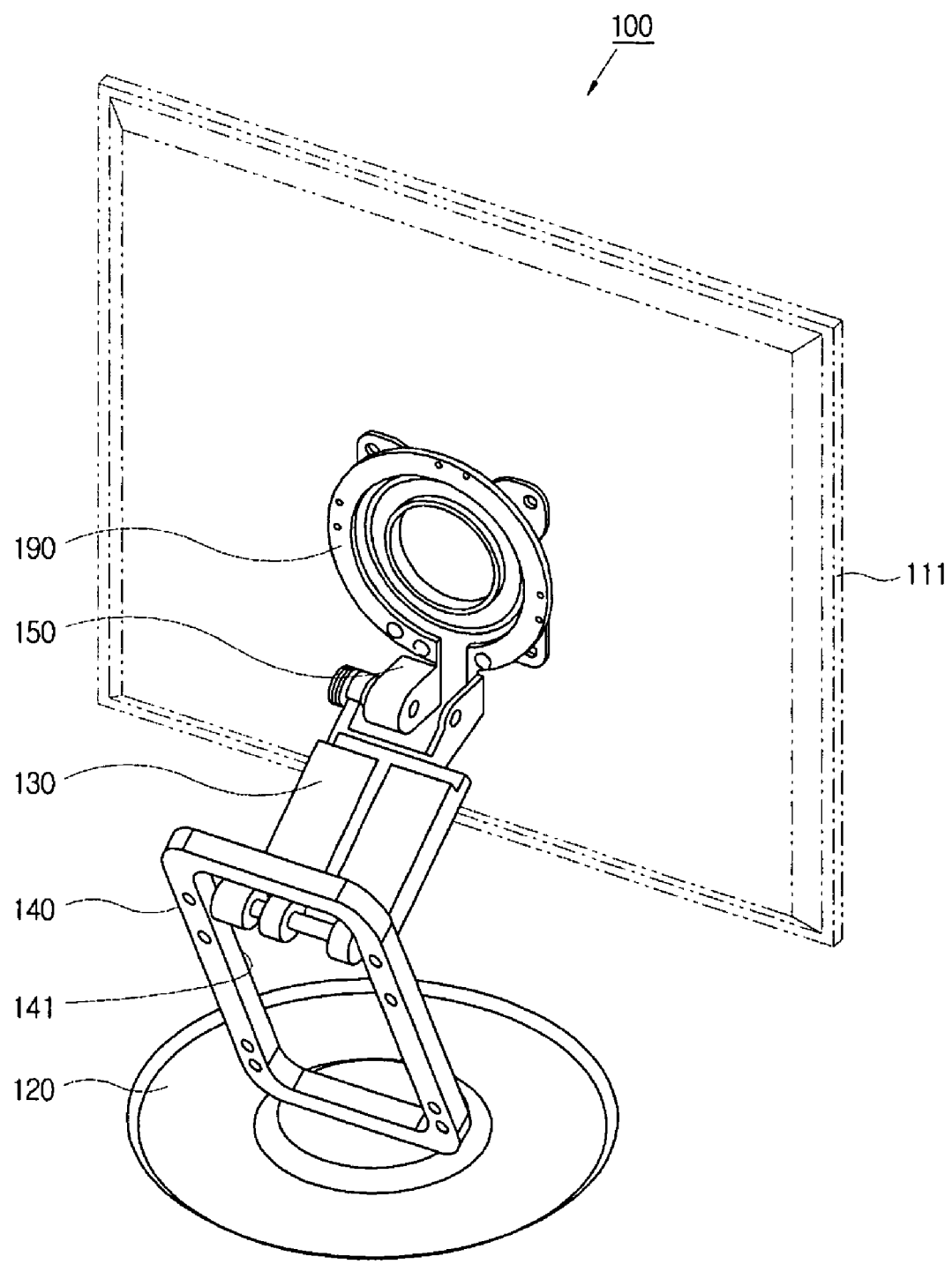
FIG. 11 is a rear perspective view illustrating a display apparatus according to an exemplary embodiment of the present invention.
Figure 12:
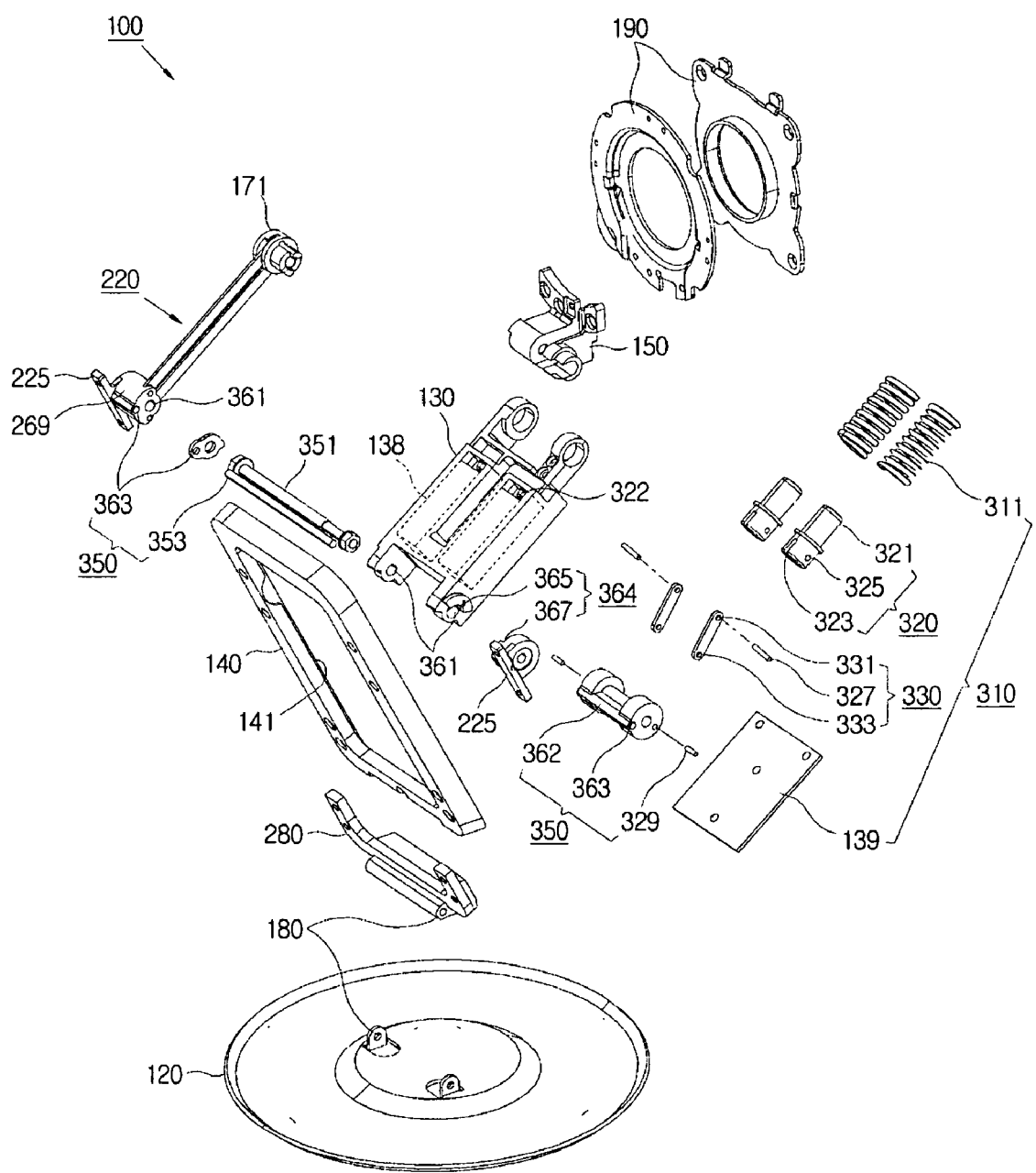
FIG. 12 is a partial exploded perspective view illustrating the display apparatus in FIG. 11.
Figure 13:
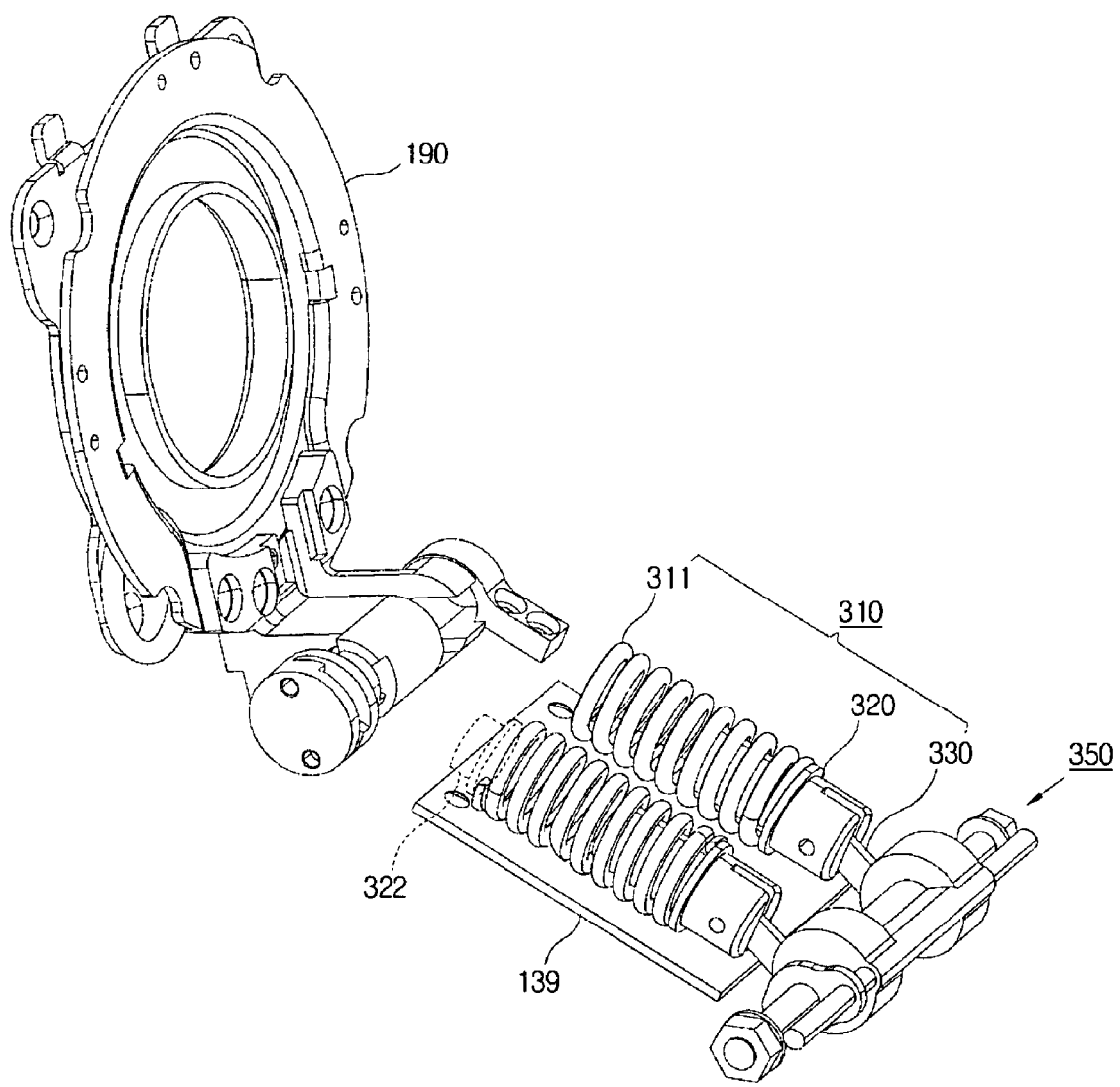
FIG. 13 is a partial perspective view illustrating the display apparatus in FIG. 11.

Hereinafter, a display apparatus according to an exemplary embodiment of the present invention will be described by referring to FIGS. 11 to 13. As shown in FIGS. 11 to 13, a display apparatus 100 according to an exemplary embodiment of the present invention comprises at least one elastic cam unit 310 provided to a first link member 130, to controllably bias against the weight of the display main body 111 within a predetermined range when the first link member 130 moves with respect to a base 120. The display apparatus 100 further comprises a cam link hinge unit 350 coupling the first link member 130 and a second link member 140 to move between a folded position and an erected position.

The elastic cam unit 310 comprises an elastic cam member 311 biasing against the weight of the display main body 111; a cam 320 provided with a first elastic cam member supporting part 321 supporting the elastic cam member 311 to a first end thereof, and an accommodating slot 323 to a second end thereof, and a cam link 330 provided with a first end coupled to the accommodating slot 323 of the cam 320, and a second end coupled to the cam link hinge unit 350. The first link member 130 comprises an elastic cam member accommodating part 381 accommodating the elastic cam unit 310, and a first link member cover 139 preventing the elastic cam unit 310 from being separated from the elastic cam member accommodating part 138.

The elastic cam member 311 supplies an elastic force biasing against the weight of the display main body 111. The elastic cam member 311 may be provided as a coil spring or a cylinder. A first end of the elastic cam member 311 is supported by a second elastic cam member supporting part 322 of the first link member 130, and a second end thereof is supported by the first elastic cam member supporting part 321 of the cam 320.

A first end of the cam 320 is provided with the first elastic cam member supporting part 321 to support the elastic cam member 311, and a second end thereof is provided with the accommodating slot 323. The cam 320 has a cylindrical shape, and a central part thereof is provided with a protrusion (not shown) protruding from a circumference thereof to support the elastic cam member 311. The cam 320 is formed with a cam link pin hole 325, through which a first link pin 327 is inserted to couple the cam 320 with the cam link 330.

A first end of the cam link 330 is coupled to the accommodating slot 323 of the cam 320, and a second end thereof is coupled to the cam link hinge unit 350. The cam link 330 converts a rotation of the first link member 130 with respect to the second link member 140 into a rectilinear motion to elastically bias the elastic cam member 311. The cam link 330 is formed with a first link pin hole 331 coupled to the first link pin 327 to a first end thereof, and a second link pin hole 333 coupled to a second link pin 329 to a second end thereof. The second link pin 329 is inserted into the second link pin hole 333 to couple the cam link 330 with the cam link hinge unit 350. The position of the second link pin hole 333 with respect to the cam link hinge unit 350, the length of the cam link 330, and the position of the first link pin hole 331 with respect to the cam 320 may be varied, based on the sizes of the first link member 130 and the second link member 140, a rotating angle, and the elasticity of the elastic cam member 311.

Accordingly, an elastic force of the link members 130 and 140 can be reduced when folded, and the display apparatus 100 can be stably packed.

The cam link hinge unit 350 couples the first link member 130 and the second link member 140, so that the first link member 130 and the second link member 140 move between the folded position and the erected position. The cam link hinge unit 350 comprises a hinge shaft coupling part 362 provided to a lower part of the first link member 130 to be coupled with the cam link 330, a first cam link hinge shaft 351 coupled to a first side of the hinge shaft coupling part 362 to serve as a rotating axis of the first link member 130 and the second link member 140, and a second cam link hinge shaft 353 spaced from the first cam link hinge shaft 351 to be coupled with a second side of the hinge shaft coupling part 362. The first cam link hinge shaft 351 of the cam link hinge unit 350 comprises first hinge shaft coupling holes 361 formed to lower opposite sides of the first link member 130, that is, a lower sub link coupling part 269 and a sub link member bracket 225. The second cam link hinge shaft 353 comprises a second hinge shaft coupling hole 363 formed to a side of the lower sub link coupling part 269.

A cam link angle restricting part 364 comprises a cam protrusion 367 protruding from one of an end part of the second link member 140 and the sub link member bracket 225 toward the other thereof, and a cam protrusion guiding part 365 provided to the other thereof to rotatably guide the cam protrusion 367 within a predetermined range.

A base bracket 280 is coupled to the second link member 140 with a first side thereof, and is coupled to the base 120 with a second side thereof. The base bracket 280 and the base 120 are coupled with each other through a base hinge unit 180.

Hereinafter, an operation of the display apparatus 100 according to an exemplary embodiment of the present invention will be described by referring to FIGS. 14A to 14C.

Figure 14A:
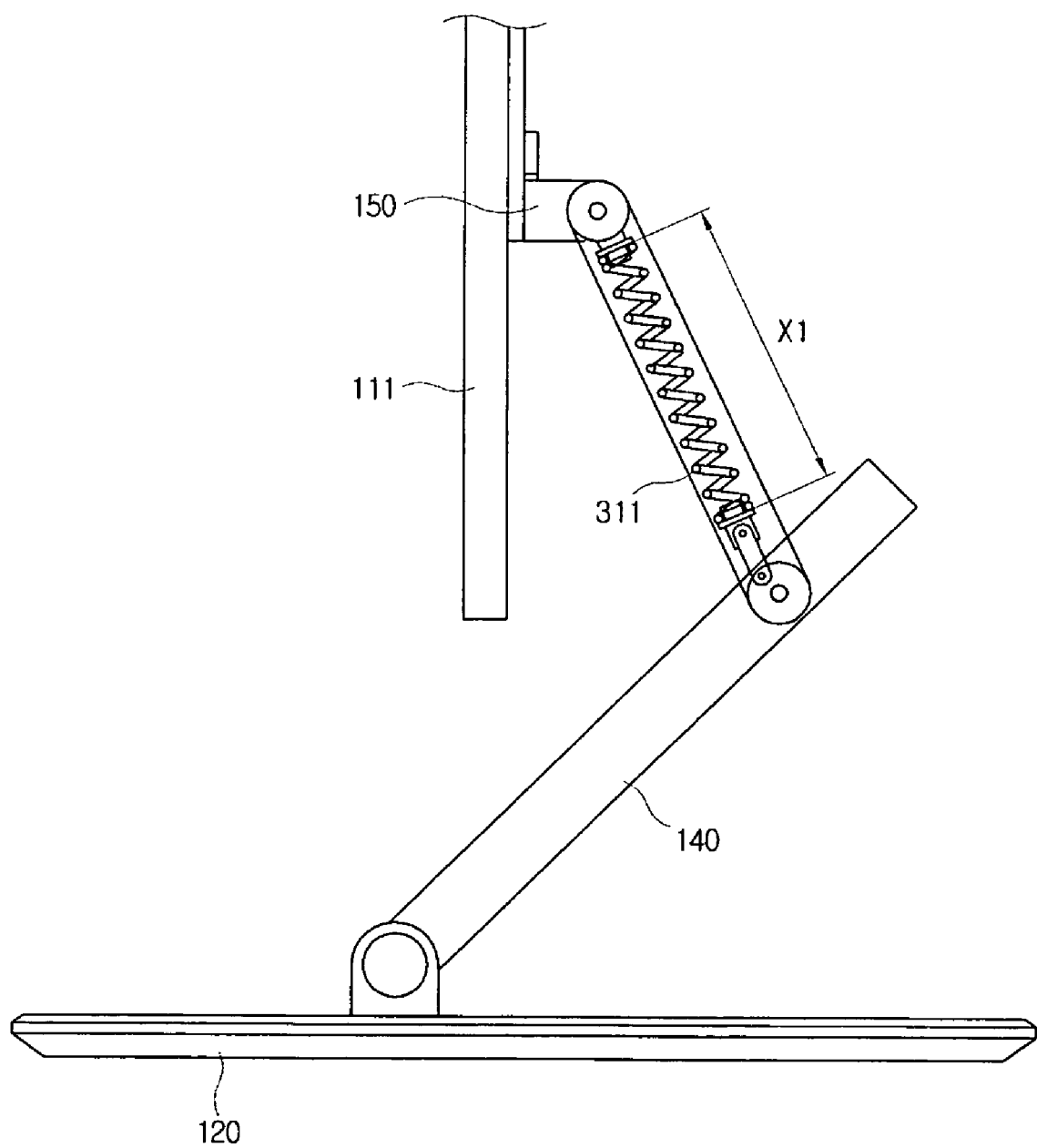
FIGS. 14A to 14C are side sectional views illustrating operations of the display apparatus in FIG. 11.

As shown in FIG. 14A, in the erected position, the elastic cam member 311 has a first length X1, with which the elastic cam member 311 is relatively less biased. Thus, an elastic force against the display main body 111 can decrease.

Figure 14B:
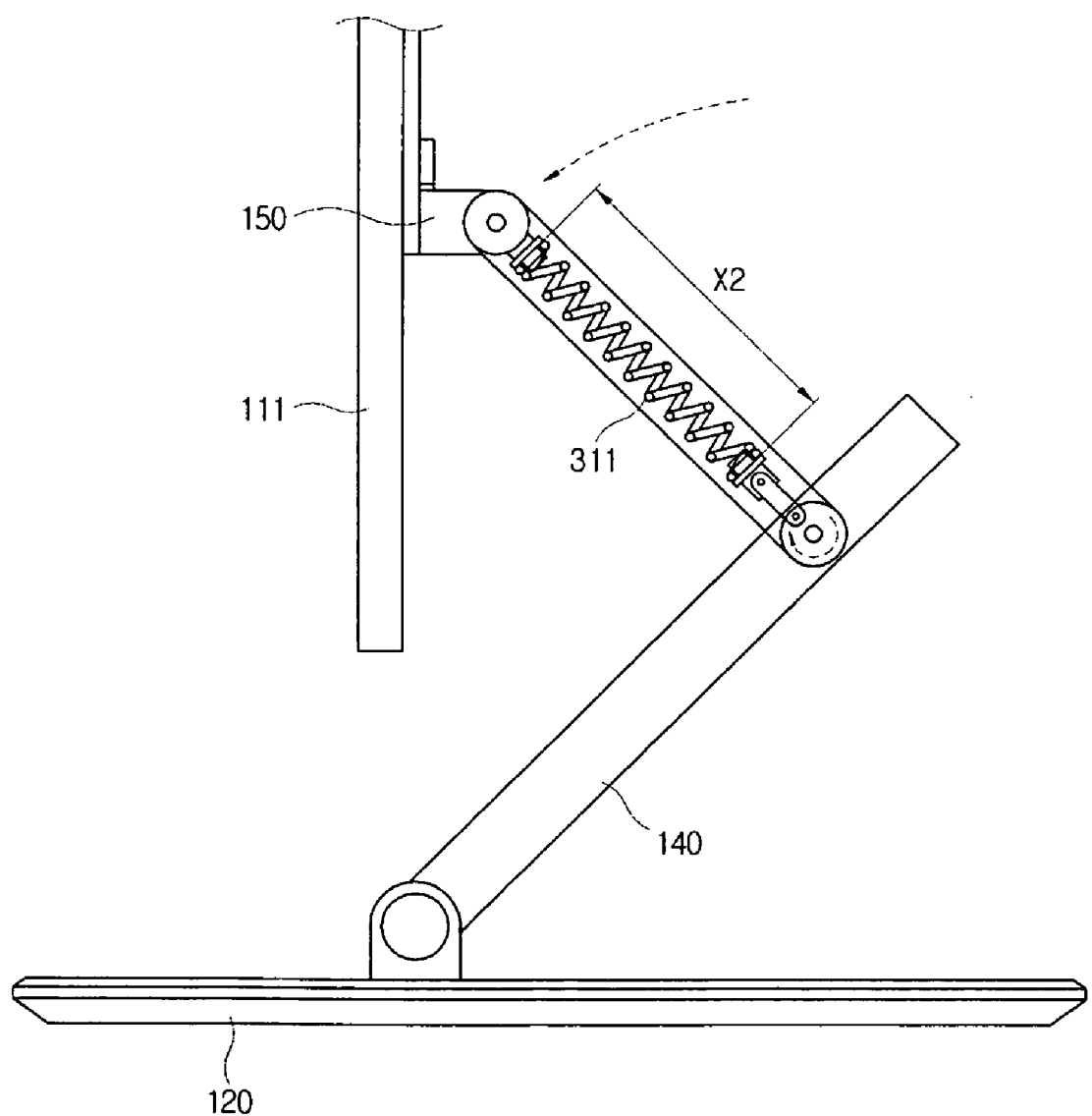

As shown in FIG. 14B, if the first link member 130 and the second link member 140 rotate, the elastic cam member 311 has a second length X2 which is smaller than the first length X1, due to the variation of the distance between the cam 320 and the cam link hinge unit 350. Thus, an elastic force against the display main body 111 can increase.

Figure 14C:
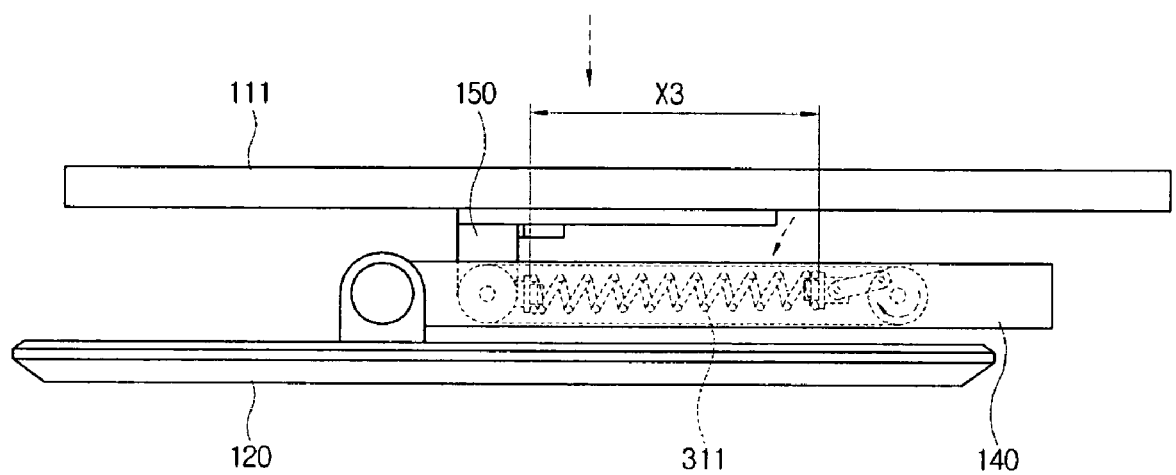

As shown in FIG. 14C, in the folded position, the elastic cam member 311 has a third length X3 which is bigger than the second length X3, due to the variation of the distance between the cam 320 and the cam link hinge unit 350. Thus, an elastic force against the display main body 111 can decrease.

An elastic force against the display main body 111 can be varied by changing the positions of the first and second link pin holes 331 and 333, and the shape of the cam link 333.

Accordingly, when the link members 130 and 140 are folded or rotated, an elastic force thereof can be controlled, and the display apparatus 100 can be prevented from being deformed or damaged when being packed or carried.

As described above, the present invention provides a display apparatus which folds a link member in the same plane, thereby minimizing the volume thereof when being packed or carried.

Also, the present invention provides a display apparatus which reduces an elastic force of a link member which is folded, thereby being stably packed or carried.

Although a few exemplary embodiments of the present invention have been shown and described, it will be appreciated by those skilled in the art that changes may be made in these embodiments without departing from the principles and spirit of the invention, the scope of which is defined in the appended claims and their legal equivalents.

What is claimed is:

1. A display apparatus comprising:
    a display main body;
    a base;
    a first link member having a first end part and a second end part, the first link member being relatively movably coupled to the display main body at the first end part thereof;
    a second link member comprising a lower side, an upper side, and a link accommodating part formed in a central portion of the second link member,
    wherein when the first and second link members are in a folded condition, the first link member is accommodated within the link accommodating part of the second link member so that the first end part of the first link member is positioned near the lower side of the second link member, and the first link member is disposed in a same plane as the second link member,
    wherein the second link member is coupled with the second end part of the first link member through a link hinge unit at the upper side thereof to move with respect to the first link member and,
    wherein the base and the lower side of the second link member are coupled through a base hinge unit having an axis which is parallel to the axis of the link hinge unit; and
    a swiveling hinge unit coupled to the base to swivel the display main body with respect to an installation surface.

2. The display apparatus according to claim 1, further comprising a sub link member interposed between the display main body and the base to transfer a rotation of the first link member with respect to the second link member to the display main body.

3. The display apparatus according to claim 2, further comprising a sub elastic member interposed between the first link member and the sub link member to elastically bias the display main body.

4. The display apparatus according to claim 1, wherein the display main body moves with respect to the first link member when at least one of the first link member and the second link member moves with respect to the base.

5. The display apparatus according to claim 1, further comprising at least one elastic cam unit provided to the first link member to controllably bias the display main body within a predetermined range when the first link member moves with respect to the base.

6. The display apparatus according to claim 5, wherein the elastic cam unit comprises:
    an elastic cam member which elastically biases the display main body;
    a cam comprising a first elastic cam member supporting part which supports the elastic cam member, and an accommodating slot; and
    a cam link which connects the cam and the link hinge unit.

7. The display apparatus according to claim 6, wherein the first link member comprises an elastic cam member accommodating part which accommodates the elastic cam member, and
    a side of the elastic cam member accommodating part comprises a second elastic member supporting part which supports the elastic cam member.

8. The display apparatus according to claim 6, wherein the link hinge unit comprises a cam link accommodating part which accommodates the cam link.

9. A display supporting apparatus, comprising:
    a base;
    a first link member which rotates with respect to the base, the first link member comprising a first end part and a second end part; and
    a second link member comprising a lower side, an upper side, and a link accommodating part formed in a central portion of the second link member,
    wherein when the first link and the second link members are in a folded condition, the first link member is accommodated within the link accommodating part of the second link member so that the first end part of the first link member is positioned near the lower side of the second link member, and the first link member is disposed in a same plane as the second link member, wherein the second link member is coupled with the second end part of the first link member through a link hinge unit at the upper side thereof to move with respect to the first link member, and wherein the base and the second side of the second link member are coupled through a base hinge unit having an axis which is parallel to the axis of the link hinge unit; and a swiveling hinge unit coupled to the base to swivel the display main body with respect to an installation surface.

10. The display supporting apparatus according to claim 9, further comprising a sub link member interposed between the display main body and the base to transfer a rotation of the first link member with respect to the second link member to the display main body.

11. The display supporting apparatus according to claim 10, further comprising a sub elastic member interposed between the first link member and the sub link member to elastically bias against the display main body.

12. The display supporting apparatus according to claim 9, wherein a display main body moves with respect to the first link member when at least one of the first link member and the second link member moves with respect to the base.

13. The display supporting apparatus according to claim 9, further comprising at least one elastic cam unit provided to the first link member to controllably bias a display main body within a predetermined range when the first link member moves with respect to the base.

14. The display supporting apparatus according to claim 13, wherein the elastic cam unit comprises:
   an elastic cam member which elastically biases the display main body;
   a cam comprising a first elastic cam member supporting part which supports the elastic cam member, and an accommodating slot; and
   a cam link which connects the cam and the link hinge unit.

15. The display supporting apparatus according to claim 14, wherein the first link member comprises an elastic cam member accommodating part which accommodates the elastic cam member, and
   a side of the elastic cam member accommodating part comprises a second elastic member supporting part which supports the elastic cam member.

16. The display supporting apparatus according to claim 14, wherein the link hinge unit comprises a cam link accommodating part which accommodates the cam link.

17. The display apparatus according to claim 1, wherein when the first and second link members are in a folded condition, the first link member and the second link member are parallel to each other.

18. The display according to claim 9, wherein when the first and second link members are in a folded condition, the first link member and the second link member are parallel to each other.

* * * * *